United States Patent [19]

Delans

[11] Patent Number: 4,983,475
[45] Date of Patent: Jan. 8, 1991

[54] BAR FOR CONNECTING TOGETHER TWO PLATE STRAPS OF THE SAME POLARITY ON AN ELECTROCHEMICAL BATTERY

[76] Inventor: Darwin D. Delans, 1184 Dickerson Rd., North Wales, Pa. 19454

[21] Appl. No.: 479,174

[22] Filed: Feb. 13, 1990

[51] Int. Cl.$^5$ .............................................. H01M 2/20
[52] U.S. Cl. .................................... 429/160; 429/161; 429/211; 429/121
[58] Field of Search ............... 429/158, 160, 161, 211, 429/178, 121; 439/500

[56] References Cited

U.S. PATENT DOCUMENTS

| | | | |
|---|---|---|---|
| 1,362,554 | 12/1920 | Balzane | 429/158 |
| 2,132,793 | 10/1938 | Kyle | 136/135 |
| 2,511,943 | 6/1950 | Reed | 136/134 |
| 3,484,290 | 12/1969 | Knight | 136/6 |
| 3,518,127 | 6/1970 | Aronson | 136/134 |
| 3,711,335 | 1/1973 | Daniel | 136/135 S |
| 3,836,401 | 9/1974 | Niklas et al. | 429/161 X |
| 4,587,183 | 5/1986 | McCartney, Jr. | 429/176 |
| 4,777,101 | 10/1988 | Blomberg | 429/160 X |

FOREIGN PATENT DOCUMENTS

| | | | |
|---|---|---|---|
| 372773 | 4/1923 | Fed. Rep. of Germany | 429/186 |
| 3329 | 2/1891 | Switzerland | 429/211 |
| 3113 | 11/1897 | United Kingdom | 429/186 |

*Primary Examiner*—Anthony Skapars
*Attorney, Agent, or Firm*—Joseph Scafetta, Jr.

[57] ABSTRACT

An electrochemical battery has a plurality of alternating positive and negative plates; at least one tab protruding from one edge of each of the positive and negative plates; at least one tab protruding from an opposite edge of each of the positive and negative plates; a pair of negative plate straps connecting together each tab protruding from each negative plate; a pair of positive plate straps connecting together each tab protruding from each positive plate; a first diagonal bar connecting together the pair of negative plate straps; and a second diagonal bar connecting together the pair of positive plate straps. A key advantage of the invention is that resistance is reduced and electrical characteristics of the battery are improved under load conditions. Another advantage of the invention is that a manufacturer of conventional batteries either can use existing top-mounted terminal posts or can support side-mounted terminal posts with the diagonal bars.

20 Claims, 3 Drawing Sheets

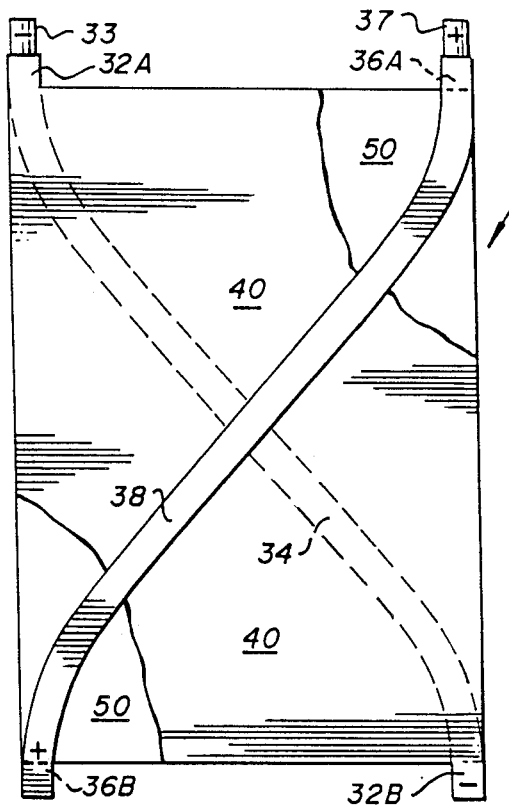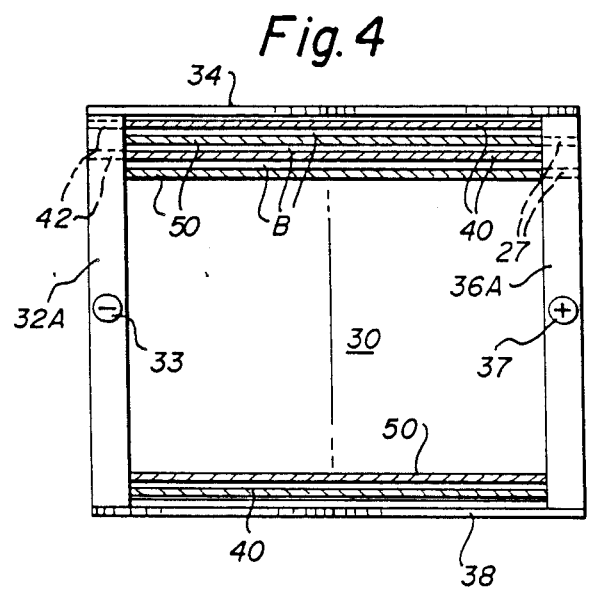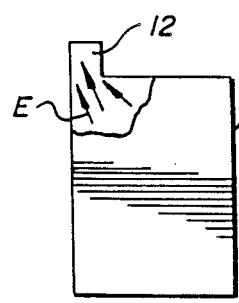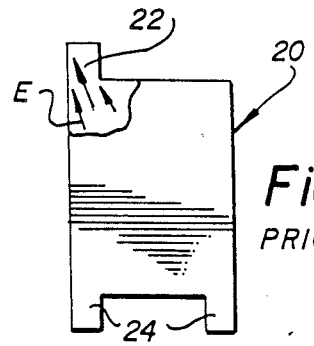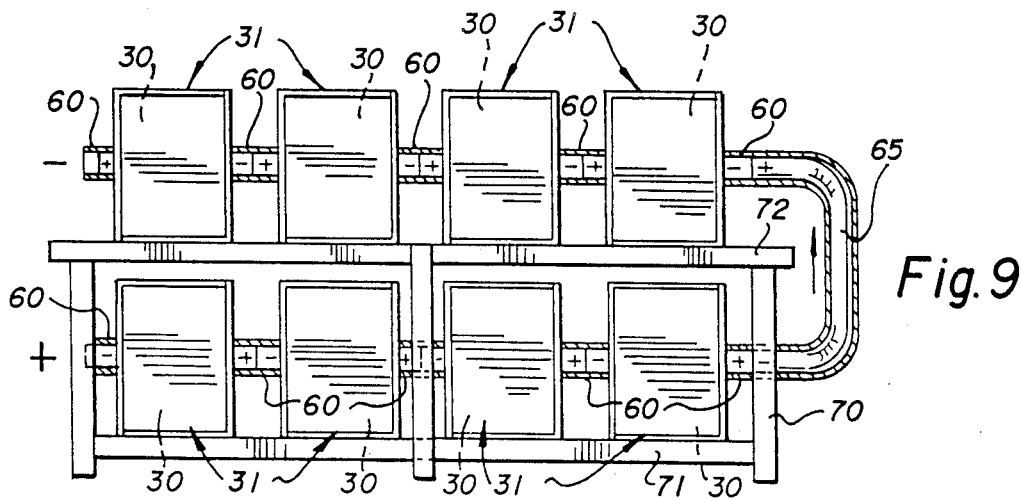

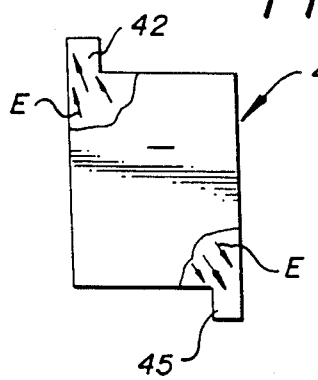
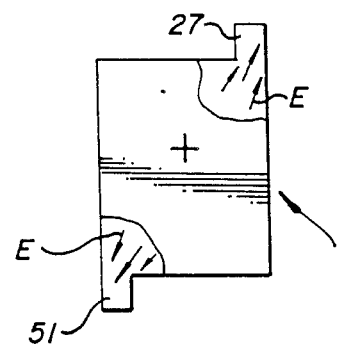
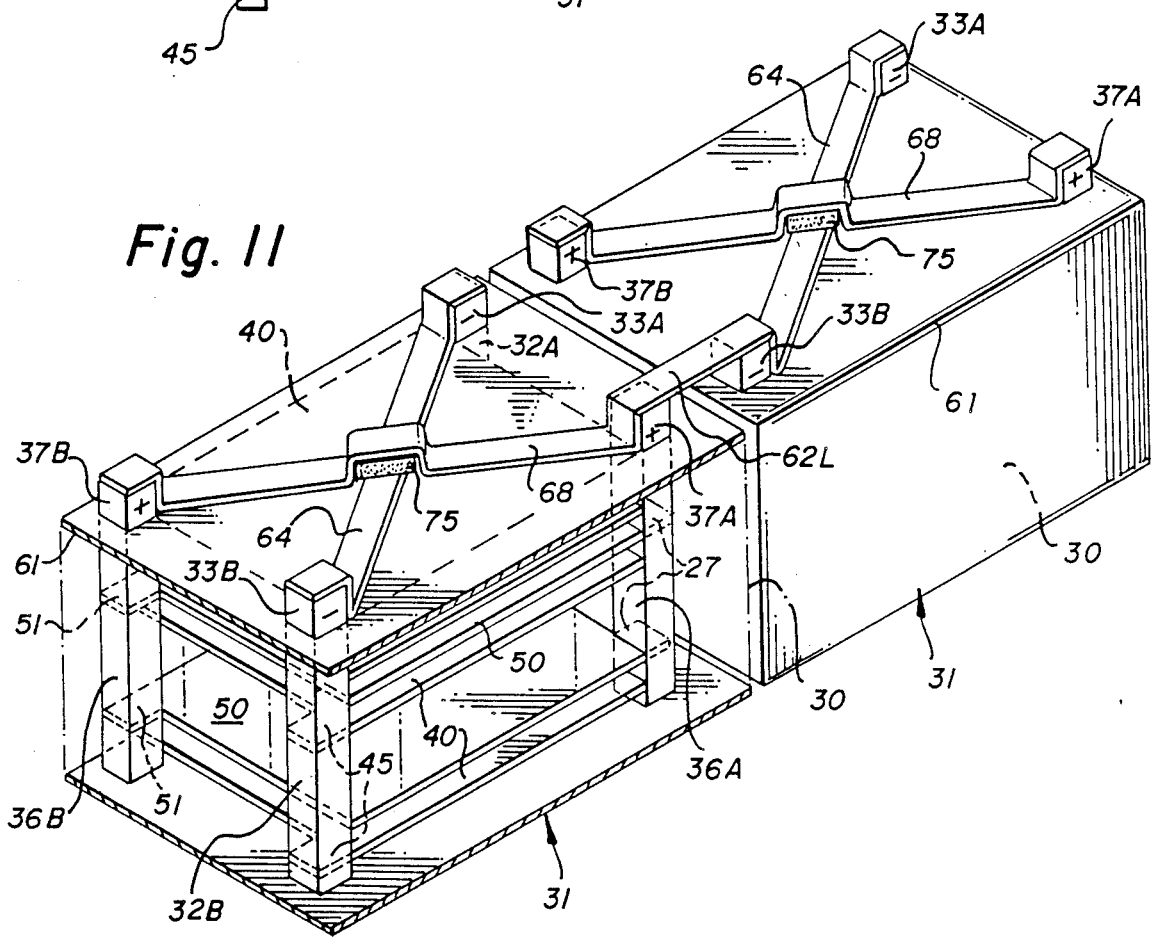
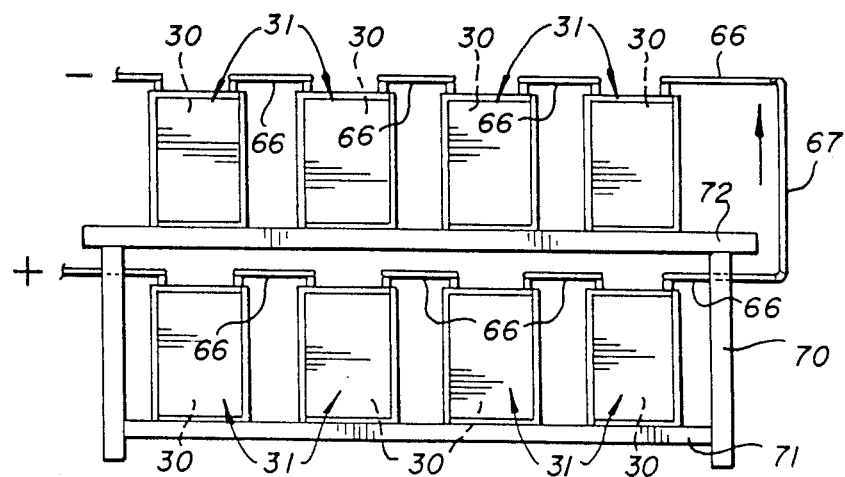

2

BAR FOR CONNECTING TOGETHER TWO PLATE STRAPS OF THE SAME POLARITY ON AN ELECTROCHEMICAL BATTERY

BACKGROUND OF THE INVENTION

1. Field of the Invention

The invention relates to electrochemical batteries in general and, in particular, to a bar for connecting together two plate straps of the same polarity on an electrochemical battery.

2. Description of the Related Art

A standard electrochemical battery can have either one cell or multiple cells connected together within a container. The cells can be either two, four, six, or eight in number. On each plate, there is usually a single plate tab which extends above the bath.

For example, in FIG. 1 showing one of the earliest prior art devices, a plate 10 of either positive or negative polarity has a single tab 12 on its left top corner to which electricity in the plate 10 flows when a load is applied to the battery. The direction of electrical flow is designated by an arrow E. This prior art device shown in FIG. 1 typifies the battery plate illustrated in FIG. 1 of Swiss Pat. No. 3,329 issued on Feb. 26, 1891, to Scholler et al.

In order to obtain a more uniform utilization of the electrochemical reactions, there was later developed a prior art arrangement in which one set of positive plates 10 had each of the tabs 12 aligned on one top corner while a second set of negative plates 10 had each of its tabs aligned on an opposite bottom corner. Such a prior art arrangement is not shown in the drawings, but is typified by the batteries illustrated in British Pat. No. 3,113 issued on Feb. 5, 1897, to Von Berks et al. and in German Pat. No. 372,773 issued on Apr. 3, 1923, to Tsuji et al.

A still later development in the prior art is shown in FIG. 2 in which a plate 20 of either positive or negative polarity has a first tab 22 on its left top corner and a second tab (not shown) on its right top corner. Third and fourth tabs 24 are provided on its bottom corners. The purposes of this prior art development were threefold: first, to reduce plate buckling; second, to provide continuity of electrical flow if any one connection is broken; and third, to make the unit more stable by having the plates rest on the bottom of the container. This prior art development is typified by U.S. Pat. No. 2,511,943 issued on June 20, 1950, to Reed and by U.S. Pat. No. 3,518,127 issued on June 30, 1970, to Aronson.

In this later prior art development shown in FIG. 2, the top left tabs 22 are connected together by a first so-called plate strap (not shown) and the top right tabs (not shown) are also connected together by their individual plate straps, likewise not shown. Each top plate strap is then connected to its respective terminal post (not shown) of either positive or negative polarity. The bottom plate straps are not connected to any terminal posts. Each terminal post extends outside the battery casing and conventionally protrudes from a top panel of the battery casing.

However, it is also known to have each terminal post extend from opposite side panels of the battery casing. Such battery casings on which the terminal posts are mounted on the sides thereof are shown in the following disclosures: U.S. Pat. No. 2,132,793 issued on Oct. 11, 1938, to Kyle; U.S. Pat. No. 3,484,290 issued on Dec. 16, 1969, to Knight; and U.S. Pat. No. 3,711,335 issued on Jan. 16, 1973, to Daniel.

Nevertheless, despite all these advances in the prior art, persons skilled in battery technology are still attempting to improve the electrical characteristics of batteries under load conditions.

SUMMARY OF THE INVENTION

It is a primary object of the present invention to improve the electrical characteristics of electrochemical batteries under load conditions by electrically and mechanically connecting together two plate straps of the same polarity with a diagonal bar arrangement. This object is accomplished by providing a diagonal bar arrangement that reduces the effective internal battery plate resistance so that the electrical characteristics of the electrochemical battery are improved under load conditions. In other words, the diagonal bar of the present invention serves as a low resistance path for an electrical current, gathered at multiple plate tabs, to flow to the terminal posts of the battery.

The result of this object is the replacement of battery configurations having conventional top-mounted posts with a novel configuration that is more efficient in getting power out of the battery per square foot of floor space. In other words, the invention extracts more power out of a so-called "footprint" by increasing the energy density of the battery, as measured in amphere hours per square foot.

It is a secondary object of the present invention to provide a diagonal bar arrangement which serves as a platform for supporting side-mounted terminal posts so that an electrical path of minimum length is provided to the next battery.

Another benefit of the diagonal bar arrangement supporting the side-mounted terminal posts used in the present invention is that stress is minimized on a container cover seal and on each terminal post. This stress is due to so-called "plate growth" caused by battery aging processes.

It is a tertiary object of the present invention to provide either straight or curved diagonal bar arrangements for connecting multiple plate straps to two side terminal posts. Both the curved or preferably S-shaped diagonal bar and the substantially straight diagonal bar will straighten out as the battery "grows" due to the so-called "plate growth" caused by the battery aging processes. Plate growth may be defined as the increase in the volume of the battery caused by the breakdown of lead dioxide ($PbO_2$) into precipitates of larger volume, such as lead sulfate ($PbSO_4$), which needs more space as it is deposited during the battery aging processes.

It is a further object of the present invention to provide a diagonal bar arrangement wherein the width and the thickness of the diagonal bar may be varied according to the manufacturing needs of the user.

These and other objects and advantages of the present invention will be better understood after a review of the following drawings in conjunction with a careful study of the subsequently detailed description of the preferred embodiments.

BRIEF DESCRIPTION OF THE DRAWINGS

FIG. 1 is a side elevational view of an early development in the prior art of making a plate for use in a cell of an electrochemical battery.

FIG. 2 is a side elevational view of a later development in the prior art of making a plate for use in an electrochemical battery.

FIG. 3 is a side elevational view of a first embodiment of the present invention.

FIG. 4 is a partial cross-sectional top plan view of the first embodiment of the present invention.

FIG. 9 is a front elevational view of a rack for supporting a plurality of interconnected electrochemical batteries, also used with either the second or the third embodiment of the present invention.

FIG. 10A is a side elevational view of a negative plate for use in a cell of an electrochemical battery of the present invention.

FIG. 10B is a side elevational view of a positive plate for use in a cell of an electrochemical battery of the present invention.

FIG. 11 is a partially broken away perspective view of a fourth embodiment of the present invention.

FIG. 12 is a front elevational view of a rack for supporting a plurality of interconnected electrochemical batteries, used with either the first or the fourth embodiment of the present invention.

DETAILED DESCRIPTION OF THE PREFERRED EMBODIMENTS

Figure 5:
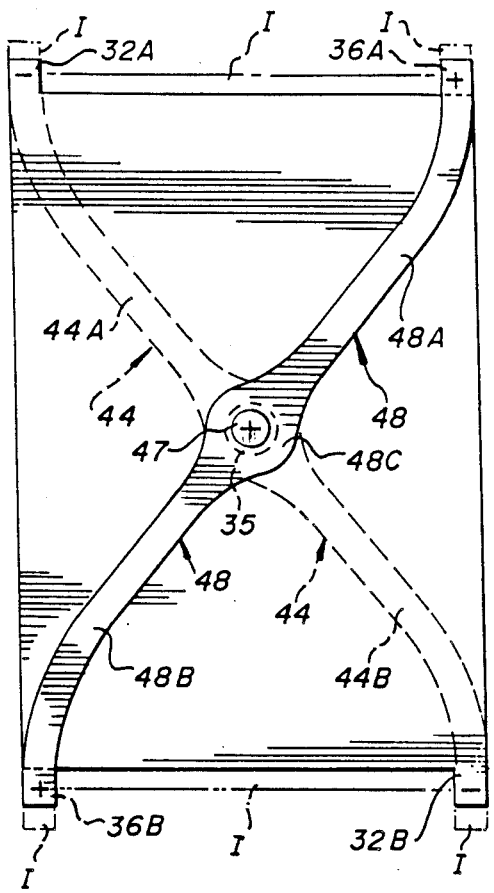
FIG. 5 is a side elevational view of a second embodiment of the present invention.

Initially, reference is made to FIG. 10A which shows a plate 40 of negative polarity for use in all embodiments of the present invention. This negative plate 40 has a first tab 42 on the left top corner and a second tab 45 on its opposite right bottom corner.

In FIG. 10B of the drawings, a plate 50 of positive polarity, also for use in all embodiments of the present invention, has a first tab 27 on its right top corner and a second tab 51 on its opposite left bottom corner.

The purpose of providing the opposite tabs 42 and 45 on the negative plate 40 seen in FIG. 10A and the opposite tabs 27 and 51 on the positive plate 50 seen in FIG. 10B is to increase the electrical flow in opposite directions indicated by the arrows E so that increased electric current can flow through each of the plates 40 and 50.

Referring now to FIG. 3 of the drawings, a first embodiment of the present invention is shown. An electrochemical battery 30 has an outer body casing (not shown). On top of the negative plates 40, there is a negative plate strap 32A on which a negative terminal post 33 is mounted. On the bottom of the negative plates 40, there is an identical negative plate strap 32B which is connected at one end to an end of the top negative plate strap 32A by a first, curved, somewhat S-shaped, diagonal bar 34, shown only in phantom lines. The outermost negative plate 40 is partially broken away to show part of a positive plate 50 therebehind. On top of the positive plates 50, there is a positive plate strap 36A, shown only in phantom lines. A positive terminal post 37 is mounted on the positive plate strap 36A. On the bottom of the positive plates 50, there is an identical positive plate strap 36B, likewise shown only in phantom lines. A second, curved, somewhat S-shaped, diagonal bar 38 connects one end of the bottom positive plate strap 36B to an end of the top positive plate strap 36A.

In FIG. 4 of the drawings, a plan view of the first embodiment shown in FIG. 3 is illustrated with a partial cross-section taken through the top of the battery 30 in order to expose a plurality of the negative plates 40, each spaced alternately from a plurality of the positive plates 50. The plates 40 and 50 are placed in contact with an electrolytic solution B.

As shown in FIG. 10A, each negative plate 40 has a top tab 42 which is shown only in phantom lines in FIG. 4. Similarly, each positive plate 50 has a top tab 27 which is also shown only in phantom lines in FIG. 4.

The top tabs 42 extending upwardly from the negative plates 40 are connected together by the top negative plate strap 32A on which the negative terminal post 33 is mounted and from which at one end the diagonal bar 34 extends to the bottom opposite side of the battery 30 to join the end of the bottom negative plate strap 32B, not shown in FIG. 4. However, see FIG. 3.

Likewise, in FIG. 4, the top tabs 27 extending upwardly from the positive plates 50 are connected together by the top positive plate strap 36A on which the positive terminal post 37 is mounted and from which at one end the diagonal bar 38 extends to the bottom opposite side of the battery 30 to join the end of the bottom positive plate strap 36B, also not shown in FIG. 4. However, see FIG. 3 again.

In FIG. 5 of the drawings, a second embodiment of the present invention is shown. On top of the battery 30, the negative plate strap 32A is positioned and is connected by an upper arm 44A of a first, curved, somewhat S-shaped, diagonal bar 44, shown only in phantom lines, to a negative terminal post 43, not shown in FIG. 5. However, see FIG. 6. On the bottom of the battery 30, the identical negative plate strap 32B is connected at one end to the negative terminal post 43 (not shown in FIG. 5, but see FIG. 6) by a lower arm 44B of the first diagonal bar 44, shown only in phantom lines. Similarly, on top of the battery 30, the positive plate strap 36A, also shown only in phantom lines, is positioned and is connected by an upper arm 48A of a second, curved, somewhat S-shaped, diagonal bar 48 to a positive terminal 47. On the bottom of the battery 30, the identical positive plate strap 36B is connected at one end to the positive terminal post 47 by a lower arm 48B of the second diagonal bar 48. This second diagonal bar 48 has a widened central portion 48C which surrounds the positive terminal post 47 so that the central portion 48C serves as a platform for supporting the terminal post 47 in order to minimize any stress on a seal 35 packed between a side cover (not shown in FIG. 5) and the positive terminal post 47. A similar arrangement is used for supporting the negative terminal post 43 shown in FIG. 6.

This stress is due to so-called "plate growth" caused by the aging processes that adversely affect the battery 30. Such plate growth is illustrated by the phantom lines which show an increase I in the height on top of the battery 30, the negative plate strap 32A, and the positive plate strap 36A. Similarly, such plate growth is illustrated by additional phantom lines showing the increase I in depth on the bottom of the battery 30, the negative plate strap 32B, and the positive plate strap 36B.

Figure 6:
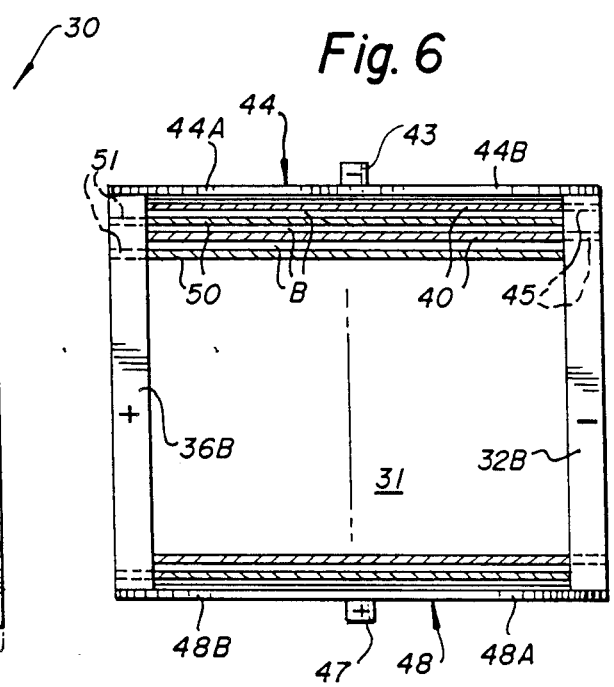
FIG. 6 is a partial cross-sectional bottom plan view of the second embodiment of the present invention.

In FIG. 6 of the drawings, a plan view of the second embodiment shown in FIG. 5 is illustrated with a partial cross-section taken through the bottom of the battery 30 in a manner similar to the partial cross-section shown in FIG. 4 in regard to the top plan view of the first embodiment. Thus, each one of the plurality of negative plates 40 is spaced alternately from each one of the plurality of positive plates 50. All plates 40 and 50 are placed in contact with the electrolytic solution B. Each negative plate 40 has its bottom tab 45, shown only in phantom lines in FIG. 6, and each positive plate 50 has its bottom tab 51, likewise shown only in phantom lines in FIG. 6. In the manner akin to the first embodiment seen in FIG. 4, the bottom tabs 45 of the negative plates 40 shown in FIG. 6 illustrating the second embodiment are connected together by the bottom negative plate strap 32B from which at one end the lower arm 44B of the diagonal bar 44 extends to the negative terminal post 43. The upper arm 44A of the diagonal bar 44 extends from the negative terminal post 43 to join the end of the top negative plate strap 32A, not shown in FIG. 6. However, see FIG. 5. Also in the manner akin to the first embodiment seen in FIG. 4, the bottom tabs 51 of the positive plates 50 are shown in FIG. 6 illustrating the second embodiment and are connected together by the bottom positive plate strap 36B from which at one end the lower arm 48B of the diagonal bar 48 extends to the positive terminal post 47. The upper arm 48A of the diagonal bar 48 extends from the positive terminal post 47 to join the end of the top positive plate strap 36A, not shown in FIG. 6. However, see FIG. 5 again.

Figure 7:
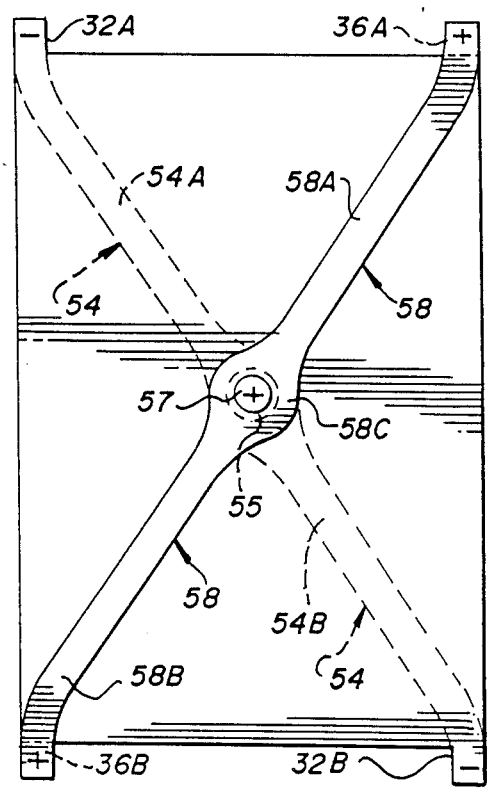
FIG. 7 is a side elevational view of a third embodiment of the present invention.

In FIG. 7 of the drawings, a third embodiment of the present invention is shown. On top of the battery 30, the negative plate strap 32A is positioned and is connected at one end by an upper arm 54A of a first, substantially straight, diagonal bar 54, shown only in phantom lines, to a negative terminal post 43 which is not shown, but which is located in a position identical to the negative terminal post 43 seen in FIG. 6 illustrating the second embodiment immediately above. On the bottom of the battery 30 seen in FIG. 7, the identical negative plate strap 32B is connected at one end to the negative terminal post 43 (not shown in FIG. 7, but see FIG. 6) by a lower arm 54B of the first diagonal bar 54, both shown only in phantom lines. Similarly, on top of the battery 30, the positive plate strap 36A, also shown only in phantom lines, is positioned and is connected at one end by an upper arm 58A of a second, substantially straight, diagonal bar 58 to a positive terminal post 57. On the bottom of the battery 30, the identical positive plate strap 36B is connected at one end to the positive terminal post 57 by a lower arm 58B of the second diagonal bar 58. This second diagonal bar 58 has a widened central portion 58C which surrounds the positive terminal post 57 so that the central portion 58C serves as a platform for supporting the terminal post 57 in order to minimize any stress on a seal 55 packed between a side cover (not shown) and the positive terminal post 57. This stress is due to the same plate growth caused by the aging processes adversely affecting the battery 30 shown and described in FIG. 5 illustrating the second embodiment.

A bottom plan view of the third embodiment shown in FIG. 7 is not illustrated because it is identical to the partial cross-sectional bottom plan view shown for the second embodiment in FIG. 6.

Figure 8:
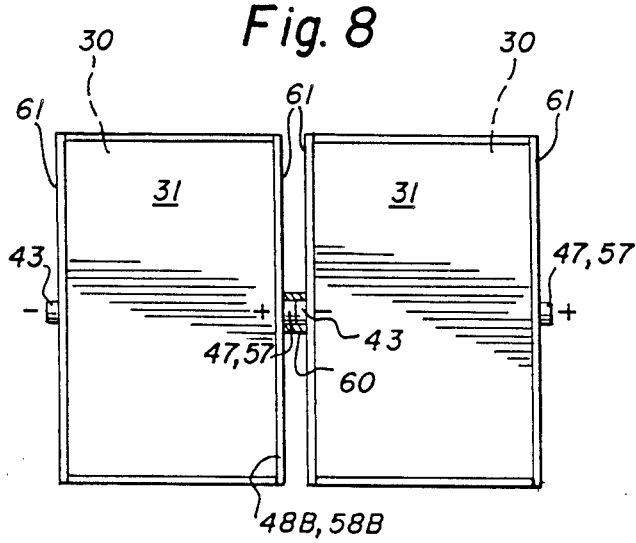
FIG. 8 is a front elevational view of a pair of interconnected electrochemical batteries used with either the second or the third embodiment of the present invention.

In FIG. 8 of the drawings, a front elevational view is shown of a pair of batteries 30 connected together by a cylindrical clamp 60 that grips the positive terminal post (47 of the second embodiment seen in FIG. 5 or 57 of the third embodiment seen in FIG. 7) of the battery 30 on the left-hand side of FIG. 8 and connects it both electrically and mechanically with the negative terminal post (43 of the second embodiment in FIG. 6; not shown for the third embodiment in FIG. 7) of the battery 30 on the right-hand side of FIG. 8.

The two batteries 30 shown in FIG. 8 are indicated by phantom lead lines because each battery 30 is enclosed within either a container or an outer casing 31 having side covers 61 that interface with the seal 35 used in the second embodiment seen in FIG. 5 and with the seal 55 used in the third embodiment seen in FIG. 7.

In FIG. 9 of the drawings, a front elevational view is shown of a plurality of batteries 30 connected together by a series of the cylindrical clamps 60. The interconnected batteries 30 are either the second embodiment shown in FIGS. 5 and 6 or the third embodiment shown in FIG. 7. An electrical connector 65 may be either a cable or a bus bar that joins the cylindrical clamp 60 on the right end of a lower tier of batteries 30 with the cylindrical clamp 60 on the same right end of an upper tier of batteries 30. A large rack 70 is provided with a lower shelf 71 for supporting the lower tier of batteries 30 and is also provided with an upper shelf 72 for supporting the upper tier of batteries 30. Although only two shelves 71 and 72 are shown supporting the two tiers of batteries 30, it will be understood that any number of shelves may be provided to support an equal number of tiers of batteries 30.

In FIG. 11 of the drawings, a perspective view is shown of a pair of batteries 30 made according to the fourth embodiment of the present invention.

Basically, this fourth embodiment is a hybrid modification of the first embodiment shown in FIGS. 3–4 and either the second embodiment shown in FIGS. 5–6 or the third embodiment shown in FIG. 7. Whereas the first embodiment uses two top-mounted terminal posts 33 and 37 in FIGS. 3–4, the second embodiment uses two side-mounted terminal posts 43 and 47 in FIGS. 5–6, and the third embodiment also uses two side-mounted terminal posts 57 in FIG. 7, this fourth embodiment uses four top-mounted terminal posts 33A, 33B, 37A, and 37B that are essentially extensions of the plate straps 32A, 32B, 36A, and 36B, respectively, protruding through the cover 61 (see FIG. 8) on the outer casing 31 of the battery 30 in the first embodiment turned on its side.

By comparing the first embodiment of FIGS. 3–4 with the fourth embodiment of FIG. 11, it will be seen that the battery 30 has a plurality of negative plates 40 alternating with a plurality of positive plates 50. As seen in the partially broken away first battery 30 in the foreground of FIG. 11, each positive plate 50 has a first tab 27 and an opposite tab 51. Likewise, each negative plate 40 has a first tab 42 (not shown in FIG. 11, but see FIG. 10A) and an opposite tab 45. The first tabs 42 (not shown in FIG. 11, but see FIG. 10A) are connected together by the negative plate strap 32A that protrudes through the cover 61 to form at one end the negative terminal post 33A. Similarly, the opposite tabs 45 are connected together by the negative plate strap 32B that also protrudes through the cover 61 and forms at the same end the negative terminal post 33B. In a similar manner in regard to the positive plates 50, the first tabs 27 are connected together by the positive plate strap 36A that protrudes through the cover 61 to form at one end the positive terminal post 37A. Similarly, the opposite tabs 51 are connected together by the positive plate strap 36B that also protrudes through the cover 61 and forms at the same end the positive terminal post 37B. The two negative terminal posts 33A and 33B are connected together by a first, substantially straight, diagonal bar 64 while the two positive terminal posts 37A and 37B are connected together by a second, substantially straight, diagonal bar 68. However, this second bar 68 is bent at the point where the first bar 64 is intersected so that the second, bar 68 can provide a housing for a nonconductive pad 75 that insulates the second bar 68 against arcing electric current across the point of intersection with the first bar 64. The electrical flow through the second bar 68 of positive polarity in the first battery 30 is conveyed by an identical lower short bus bar 62L to the same adjacent battery 30. In regard to the tranfer of electrical flow from one battery 30 to another, the bus bar 62L functions in a manner akin to the cylindrical clamp 60 shown in FIG. 9 for the second embodiment of FIGS. 5–6 and also for the third embodiment of FIG. 7.

In FIG. 12 of the drawings, a front elevational view is shown of a plurality of batteries 30 connected together by a series of long bus bars 66 extending across air gaps between the batteries 30. The interconnected batteries 30 are all first embodiments shown in FIGS. 3 and 4. However, if the batteries 30 are all fourth embodiments shown in FIG. 11, then FIG. 12 would look the same, except that the batteries 30 would be turned on their long sides and the long bus bar 66 would be replaced by the short bus bars 62L seen immediately above. An electrical connector 67 may be either a cable or another very long bus bar that joins the bus bar 66 on the right end of a lower tier of batteries 30 with the bus bar 66 on the same right end of an upper tier of batteries 30. The same large rack 70 seen in FIG. 9 is provided with the lower shelf 71 for supporting the lower tier of batteries 30 and is also provided with the upper shelf 72 for supporting the upper tier of batteries 30. Again, although only two shelves 71 and 72 are shown supporting the two tiers of batteries 30, it should be understood that any number of shelves may be provided to support an equal number of tiers of batteries 30.

The assembly of the present invention will now be described with reference to the first embodiment. Initially, it should be noted that the first embodiment shown in FIGS. 3 and 4 is a viable and practical option which makes it possible for manufacturers of conventional batteries with terminal posts only on top of the outer casings 31 to use the diagonal bar arrangement of the present invention with only minimal modification to the conventional batteries currently being made.

The basic modification required by the present invention to be made to the prior art seen in FIG. 1 involves the addition of the bottom tab 45 to the negative plate 40 seen in FIG. 10A. Also the bottom tab 51 must be added to the positive plate 50 seen in FIG. 10B. These bottom tabs 45 and 51 must then be connected together by the bottom plate straps 32B and 36B, respectively, which also must be added. Subsequently, in regard to the first embodiment, the ends of the diagonal bars 34 and 38 are welded to respective ends of the plate straps 32A, 32B, 36A, and 36B.

It is also possible to modify the plate 20 of the prior art seen in FIG. 2 by cutting off the bottom tab 24 located directly below the top tab 22. This modification is not preferred because it involves the waste of material and, more importantly, conventional batteries today have returned to using the plate 10 of the prior art seen in FIG. 1.

Because the basic modification required by the present invention is so simple, the operation of the present invention will be discussed in conjunction with the second embodiment shown in FIGS. 5 and 6 and its use shown in FIGS. 8 and 9.

However, in regard to the operation of the present invention, reference is first made to FIGS. 10A and 10B. Whenever a load is applied to the battery 30, the electrical current starts to migrate away from the center of the plates 40 and 50 in the direction of the arrow E towards the upper tabs 42 and 27 and also towards the lower tabs 45 and 51, respectively.

Referring next to the second embodiment shown in FIG. 5, the electrical current is drawn off from the top tabs by the top straps 32A and 36A. Similarly, the electrical current is drawn from the bottom tabs by the bottom straps 32B and 36B. The electrical current then travels the path of least resistance from the top positive strap 36A through the upper arm 48A and from the bottom positive strap 36B through the lower arm 48B of the diagonal bar 48 to the positive terminal post 47 which protrudes from the side cover 61 (not shown in FIG. 5) of the outer casing 31 (also not shown in FIG. 5). However, for the side cover 61 and the outer casing 31, see FIG. 8 below.

Now referring to FIG. 8, it can be seen that the electrical current gathered at the positive terminal post 47 of the battery 30 on the left-hand side then passes directly to the negative terminal post 43 through the cylindrical clamp 60 to the negative terminal post 43 of the adjacent battery 30 on the right-hand side of FIG. 8. Thereafter, the electrical current travels through the adjacent battery 30 from the negative terminal post 43 to the positive terminal post 47 on the right-hand side of FIG. 8.

Now referring to FIG. 9, it can be seen that the electrical current flows from left to right through each battery 30 in the lower tier on the shelf 71 of the rack 70 until the current reaches the last rightmost battery 30. At this point, the electrical current flows from the negative lower end of the connector 65 to the positive upper end thereof at which point the current enters the upper tier of the batteries 30 on the shelf 72 of the rack 70. The electrical current travels through each battery 30 from right to left until it reaches the most leftward battery 30 and its cylindrical clamp 60. At this end point, the current is drawn off by an electrical device, schematically designated by the "—" sign, for distributing electrical power to perform work in an industrial plant or other energy-using environment.

Thus, it should be evident from the foregoing detailed description of the preferred second embodiment shown in FIGS. 5 and 6 that the present invention improves the electrical characteristics of the batteries 30 under load conditions by electrically drawing off current from both positive tabs 27 and 51 of each positive plate 50 shown in FIG. 10B and simultaneously from both negative tabs 42 and 45 of each negative plate 40 shown in FIG. 10A. Thereafter, the electrical current is fed to the terminal posts mounted either on top of the battery 30, as shown in FIGS. 3–4 and 11 illustrating the first and fourth embodiments, respectively, or on opposite sides of the battery 30, as shown in FIGS. 5–6 and 7 illustrating the second and third embodiments, respectively.

The diagonal bar arrangement of the present invention serves as a path of least resistance for the electrical current travelling from the two plate straps, one on the top and one on the bottom, of one polarity to the single terminal post of the same polarity. For example, in the first embodiment shown in FIGS. 3 and 4, the first diagonal bar 34 connects the top plate strap 32A and the bottom plate strap 32B, both of negative polarity, to the single terminal post 33 of the same negative polarity.

Furthermore, it should also be evident, particularly from FIG. 5, as to how the diagonal bars of the present invention will straighten out to compensate for the increase I in the height as the battery 30 with the side-mounted posts "grows", i.e., expands and stretches due to the aging processes acting upon the battery 30 with its side-mounded posts 43 and 47. Of course, the S-shaped diagonal bars 44 and 48 shown in FIGS. 5 and 6 illustrating the second embodiment are capable of straightening out farther than the somewhat straight diagonal bars 54 and 58 shown in FIG. 7 illustrating the third embodiment. Nevertheless, although the diagonal bars 54 and 58 of the third embodiment are already substantially straight, they are still capable of straightening out a little farther and are intended for use with a battery 30 that is susceptible to only a small increase I in height and depth due to the so-called "plate growth" discussed above.

The fourth embodiment shown in FIG. 11 is germaine to valve-regulated or sealed lead-acid batteries more so than wet cells. There are several advantages to the fourth embodiment.

First, it will be noted that the negative plates 40 and the positive plates 50 are all horizontally oriented. Thus, oxygen gas generated on the positive plates 50 is more efficiently recombined with the hydrogen ions on the negative plates 40 because the oxygen on each positive plate 50 needs to rise only a very short distance before coming into contact with the negative plate 40 overhead. In the first three embodiments where the negative plates 40 and the positive plates 50 are oriented vertically, the oxygen gas generated on each positive plate 50 must cross a gap horizontally through the solution B before coming into contact with the adjacent negative plate 40. Because oxygen gas rises through the solution B more easily than it travels horizontally therethrough, the recombinant action of the battery 30 is more efficient for this fourth embodiment.

The second advantage of the fourth embodiment is that the outer casing 31 will require adjustment only in its height in order to accommodate more negative plates 40 and positive plates 50. Thus, the so-called "footprint" of the battery 30, defined by the length and the width of the outer casing 31, will stay the same, regardless of the height of the battery 30, as the height is increased due to the insertion of more negative plates 30 and positive plates 50 therein. Consequently, only one cover 61 is required for the top of the outer casing 31, instead of the two covers 61 which are required for the opposite lateral sides of each of the first three embodiments.

The third advantage of the fourth embodiment is that the diagonal bars 64 and 68 are located on the outside surface of the outer cover 31. Thus, these diagonal bars 64 and 68 may be made from lead-plated copper, which is known to have a lower resistance to electrical flow than solid lead. The diagonal bars 34 and 38 for the first embodiment shown in FIGS. 3-4, the diagonal bars 44 and 48 for the second embodiment shown in FIGS. 5-6, and the diagonal bars 54 and 58 for the third embodiment shown in FIG. 7 are all placed inside the outer cover 31 and are made out of solid lead which has a higher resistance to electrical flow.

From the foregoing detailed description of the four preferred embodiments, it should be apparent to those persons skilled in the art of manufacturing batteries that other constructions and modifications may be made and will still be considered within the scope of the present invention.

Therefore, it should be understood that I do not intend to be limited to the four embodiments specifically described hereinabove, but rather it is my intention to be bound only by the scope of the appended claims.

What I claim as my invention is as follows:

1. In an electrochemical battery having a plurality of alternating positive and negative plates immersed in an electrolytic solution, at least one tab protruding from one edge of each of the positive and negative plates, at least one tab protruding from an opposite edge of each of the positive and negative plates, a first negative plate strap means for connecting together each tab protruding from the one edge of each negative plate, a second negative plate strap means for connecting together each tab protruding from the opposite edge of each negative plate, a first positive plate strap means for connecting together each tab protruding from the one edge of each positive plate, a second positive plate strap means for connecting together each tab protruding from the opposite edge of each positive plate, an improvement comprising:
   a first diagonal bar means for connecting together ends of the first and second negative plate strap means; and
   a second diagonal bar means for connecting together ends of the first and second positive plate strap means.

2. The improvement according to claim 1, wherein:
   said first and second diagonal bar means are each curved so that the battery may grow as the volume of the battery increases due to plate growth.

3. The improvement according to claim 2, wherein:
   said curved first and second diagonal bar means are each S-shaped.

4. The improvement according to claim 1, wherein:
   said first and second diagonal bar means are each straight, but still allow the battery to grow as the volume of the battery increases due to plate growth.

5. The improvement according to claim 2, wherein:
   said curved first and second diagonal bar means each has a widened central portion.

6. The improvement according to claim 4, wherein:
   said straight first and second diagonal bar means each has a widened central portion.

7. The improvement according to claim 5, further comprising:
   a negative terminal post mounted on the widened central portion of the first curved diagonal bar means; and
   a postive terminal post mounted on the widened central portion of the second curved diagonal bar means.

8. The improvement according to claim 6, further comprising:
   a negative terminal post mounted at the widened central portion of the first straight diagonal bar means; and a positive terminal post mounted at the widened central portion of the second straight diagonal bar means.

9. The improvement according to claim 1, further comprising:
a negative terminal post mounted on the first negative plate strap means; and
a positive terminal post mounted on the first positive plate strap means.

10. The improvement according to claim 1, further comprising:
a nonconductive pad means, housed between the first and second diagonal bar means, for insulating said first and second diagonal bar means against arcing at a point of intersection therebetween.

11. An electrochemical battery comprising:
at least two pairs of alternating positive and negative plates;
at least one tab protruding from one edge of each of the positive and negative plates;
at least one tab protruding from an opposite edge of each of the positive and negative plates;
a pair of negative plate strap means for connecting together each tab protruding from each negative plate;
a pair of positive plate strap means for connecting together each tab protruding from each positive plate;
a first diagonal bar means for connecting together the pair of negative plate strap means; and
a second diagonal bar means for connecting together the pair of positive strap means.

12. The battery according to claim 11, wherein:
said first and second diagonal bar means are each curved.

13. The battery according to claim 12, wherein:
said curved first and second diagonal bar means are each S-shaped.

14. The battery according to claim 11, wherein:
said first and second diagonal bar means are each straight.

15. The battery according to claim 12, wherein:
said curved first and second diagonal bar means each has a widened portion.

16. The battery according to claim 14, wherein:
said straight first and second diagonal bar means each has a widened portion.

17. The battery according to claim 15, further comprising:
a negative terminal post mounted at the widened portion of the first curved diagonal bar means; and
a positive terminal post mounted at the widened portion of the second curved diagonal bar means.

18. The battery according to claim 16, further comprising:
a negative terminal post mounted at the widened portion of the first straight diagonal bar means; and
a positive terminal post mounted at the widened portion of the second straight diagonal bar means.

19. The battery according to claim 11, further comprising:
a negative terminal post mounted on one of the pair of negative plate strap means; and
a positive terminal post mounted on one of the pair of positive plate strap means.

20. The battery according to claim 11, further comprising:
a nonconductive pad means, housed between the first and second diagonal bar means, for insulating said first and second diagonal bar means against arcing at a point of intersection therebetween.

* * * * *